April 20, 1943.    A. G. F. WALLGREN ET AL    2,317,004
LUBRICATING PISTON ENGINE
Filed Nov. 23, 1940
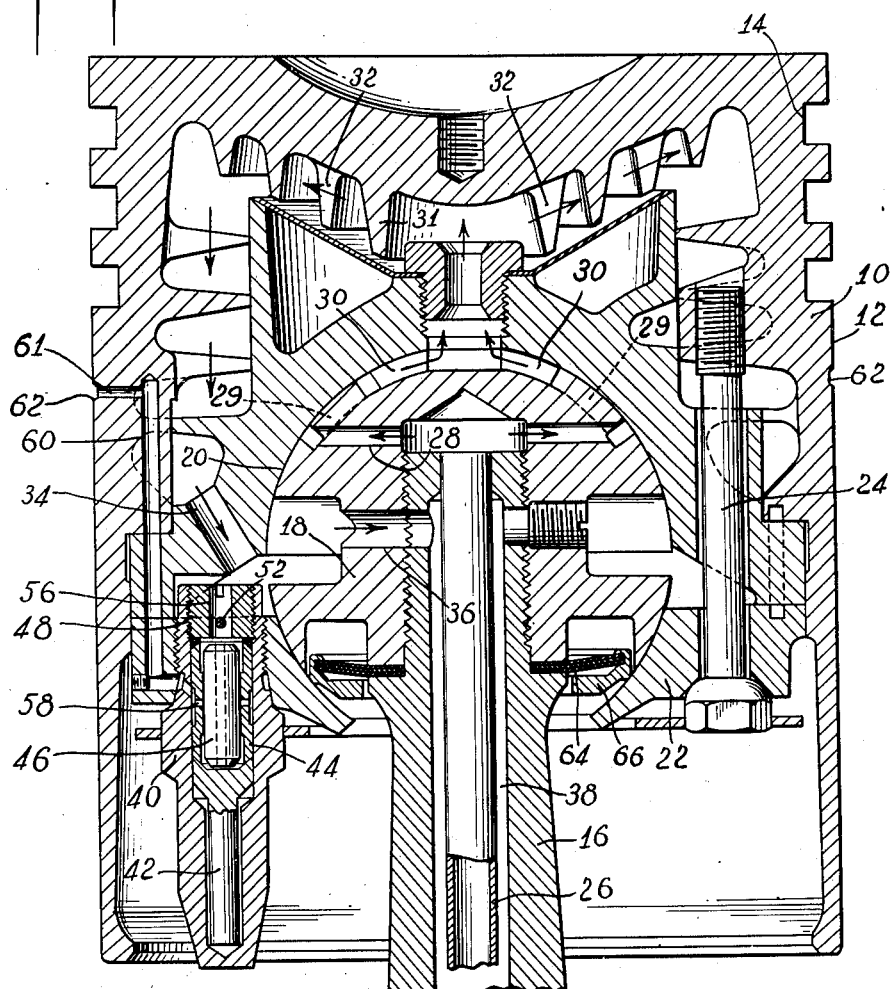
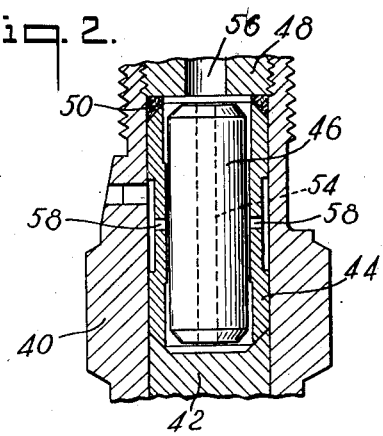
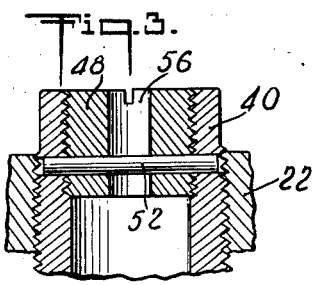

Patented Apr. 20, 1943

2,317,004

UNITED STATES PATENT OFFICE 2,317,004

LUBRICATING PISTON ENGINE

August Gunnar Ferdinand Wallgren and Kaleb Emil Evrell, Eskilstuna, Sweden

Application November 23, 1940, Serial No. 366,850 In Sweden December 13, 1939

12 Claims. (Cl. 309—6)

This invention relates to means for lubricating the sliding surfaces between the piston and the cylinder in piston engines, more particularly internal combustion motors. In the majority of such motors, that is four-stroke cycle motors and two-stroke cycle motors with compressors (that is without crank casing scavenging), the cylinder walls are lubricated simply by oil splashed from the crank case. When the piston is in its uppermost position, a portion of the cylinder wall is uncovered and will then be splashed with oil. Then, when the piston moves downwardly, the same will be smeared with oil, frequently in so great a quantity that oil scraping rings have to be provided at the lower portion of the piston, which owing to the prevailing temperature conditions are often clogged up, thus entailing an enormously increased consumption of lubricating oil and pitching or encrusting of the piston rings, and, consequently a lower compression in the combustion chamber, which causes a reduction of the output of the motor. Moreover, the exhaust gases will not be pure on account of too much lubricating oil in the combustion chamber. Certain of these disadvantages become particularly great in high pressure Diesel engines.

Motors of the two-stroke cycle type with crank casing scavenging cannot be lubricated by splashing, since in such case great quantities of the lubricating oil would follow with the scavenging air up into the combustion chamber. On the contrary, measures must be taken to reduce the amount of lubricating oil which is collected in the crank case from the various adjacent places of lubrication. In the two-stroke cycle motors with crank casing scavenging as hitherto designed, lubrication of the crank shaft is for this reason effected very sparingly, which nevertheless involves great consumption of oil, inasmuch as oil is being consumed all the time to a great extent. The cylinder is commonly lubricated in such manner that oil is supplied to the cylinder wall from a mechanically operated lubricating apparatus consisting of small plunger pumps, which are geared down so as to run very slowly relatively to the motor. Different quantities of oil may be distributed by adjustable means from these pumps to the places of lubrication in the motor, among them the cylinder. While in splash lubrication oil splashes out over the whole of the uncovered portion of the cylinder surface, the oil is supplied more locally with the use of lubricating apparatus. In consideration of price and space it is not possible, particularly in small motors, to have more than one pump plunger for every cylinder and, in most cases, more than one or very few places, at which the oil from the lubricating apparatus runs out onto the cylinder wall.

Splash lubrication and apparatus lubrication are similar in so far as the oil is supplied at the bottom of the cylinder guideway, the piston having then to spread the oil upwardly. This obviously entails that the upper portion of the piston will be lubricated in the least degree in spite of the fact that the best lubrication is required here, inasmuch as the pressure and temperature are the highest in this part. If the motor is lubricated by means of a lubricating apparatus, the latter is geared down, as stated above, in order that it shall be possible at all to distribute sufficiently small quantities of oil. This results in the cylinder wall receiving oil from the lubricating apparatus perhaps only at every fiftieth or hundredth revolution, depending on the ratio of gear in the lubricating apparatus. Proper cylinder lubrication presupposes that the oil must not flow in excessive quantities; in splash lubrication, the scraping rings are called upon to take care of the distribution, and in apparatus lubrication this is attended to by the plungers of the lubricating apparatus. For small motors, in which exceedingly small oil quantities are to be delivered per plunger stroke, the lubricating apparatus become small, and the mechanism attains the character of a clock work and frequently causes disturbances. To this must be added that the apparatus are rather expensive, besides which the provision of the requisite pipes to and from the apparatus is costly and disfiguring from the point of view of appearance.

It is the object of the invention to provide lubricating means for distributing an exact and exceedingly small quantity of lubricating oil per stroke or unit of time. Another object of the invention is to provide lubricating means ensuring effective lubrication even of the upper portion of the cylinder which is more in need of fresh and cold oil than the lower portion of the cylinder wall. A further object is to provide lubricating means without any special pipe conduits, driving mechanisms, rotating gear wheels, and the like existing in the known lubricating apparatus.

In accordance with the invention lubricating oil is supplied to the sliding surfaces between the piston and the cylinders of the engine through passages in the piston, means in said passages including two members having adjacent surfaces providing a throttling clearance, and a channel in one of said members communicating with said clearance and said passages. Said members preferably consist of a plunger and a casing or sleeve surrounding the same with a clearance, said casing having a channel connecting the interior of the clearance with the lubricating places between piston and cylinder.

The advantages gained by the invention are illustrated by the following example. A Diesel motor with a piston diameter of about 115 mm. and a normal length of stroke develops approximately 10 H. P. at 1000 revolutions per minute. The motor is of the simplest construction, that is to say, without a compressor and the like. Proper cylinder lubrication of such a motor involves a consumption of 0.5 g. per H. P. per hour, that is to say totally 5 g. The lubricating oil is preferably supplied to the cylinder at about three points evenly distributed over the circumference. Only 1.7 g. of oil will thus have to be supplied to every such point of the cylinder per hour, which involves approximately 0.03 cubic millimeters corresponding to an oil drop having a diameter of about 0.4 mm. By reason of the centrifugal force the oil is in the piston subject to a pressure amounting as far as to 12–18 atmospheres. From this it will be seen that an utmost great throttling of the oil is necessary. Round throttling apertures would obtain microscopic dimensions, so to say, and consequently they might easily become clogged up even by exceedingly small solid particles in the oil. According to the invention, it will be possible with entire safety in operation to deliver the oil in the above-mentioned minute quantities, without using any smaller aperture dimensions than 1.5 or 6 mm., and without in any place making use of clearances requiring any appreciable amount of precision. According to the invention, the plunger is preferably movable axially along its longitudinal axis which has the same direction as that of the piston or the longitudinal axis of the cylinder space. Hereby the plunger will reciprocate on account of the centrifugal force, so that sticking of the same through pitching or encrusting is effectively prevented.

Further objects and advantages of the invention will be apparent from the following description considered in connection with the accompanying drawing which forms a part of this specification, and of which:

Fig. 1 shows a longitudinal section through a piston provided with a throttling device constructed in accordance with the invention;

Fig. 2 shows parts of this device in a similar section but on an enlarged scale; and Fig. 3 is a cross-sectional view of a portion of the device shown in Fig. 1, taken at right angles to the plane of Fig. 1.

In the drawing, 10 designates a piston, the cylindrical surface 12 of which is adapted to cooperate with the wall of a motor cylinder (not shown). The piston is provided in known manner with grooves 14 for piston rings. The piston is pivotally connected to a connecting rod 16, which in the embodiment shown is provided with a head 18 bearing with a spherical surface 20 on a correspondingly shaped surface in the piston. The lower portion of the spherical piston surface 20 is formed by an annular element 22, which is secured to the body of the piston such as by bolts 24. Oil is pumped under pressure by some suitable pumping means known per se up into the piston through a pipe 26 inserted into the connecting rod. The oil continues from this pipe, as indicated by arrows, through passages 28 within the connecting rod head 18 as well as through connected passages 29 and 30 in the external bearing surface thereof. The oil then passes about a number of annular flanges 31 projecting from the underside of the piston head, which are recessed at diametrically opposed places, as indicated at 32, and then downwardly about similar flanges projecting inwardly from the cylindrical portion of the piston to passages 34 in the body of the piston. These passages 34 communicate with a passage 36 in the head of the connecting rod, and an annular clearance 38 between the pipe 26 and the inner wall of the connecting rod. Through the circulation of the oil the bearing surfaces between the pin of the connecting rod and the piston are lubricated while the latter is being cooled.

The throttling means in accordance with the invention is in the embodiment shown formed by a sleeve-like element or casing 40, which is screwed into the piston or the element 22 thereof. The sleeve 40 is preferably arranged in the lower portion of the piston and extends downwardly outside the body of the piston. The sleeve 40 will be cooled effectively thereby, particularly in engines with crank case scavenging. To the same end the sleeve 40 may be provided with cooling flanges. The sleeve or casing 40 has an inner bore containing a rod-shaped element 42, a sleeve 44, a plunger or pin 46, and a screw plug 48. The members 42 and 44 are retained in the casing 40 by means of the screw plug 48, the contact surfaces between the sleeve 44 and the member 42 and the screw plug 48, respectively, being preferably conical. Sealing rings 50, for instance of copper, may be provided between the parts 48, 44, and 42, respectively, in order safely to prevent oil from leaking out between the sleeve 44 and the casing 40. The screw plug 48 may be locked by means of a pin 52 extending through aligned apertures in the screw plug and the element 40.

The cylindrical plunger 46 is arranged according to the invention, with a clearance in the sleeve 44, as indicated in Fig. 2 on an exaggerated scale. This diametrical clearance is small and may amount to 0.04 mm., for example. An axial bore 54 extends right through the plunger 46 (see Fig. 2), so that both sides thereof are under the same oil pressure. The oil enters from the above-mentioned circulation system through an inner bore 56 in the screw 48 to the space surrounding the plunger 46. The plunger is movable axially along the longitudinal axis of the cylindrical external surface thereof, said axis being parallel to the longitudinal axis of the piston and cylinder, respectively. Extending from the center of the cylindrical annular clearance between the plunger 46 and the sleeve 44 are two opposed passages 58 or a number of such passages evenly distributed round the periphery, said passages being preferably of the same size and communicating with passage 60 in the body of the piston 10, which leads through a radial passage 61 to an annular groove 62 provided in the piston surface proper to bring about uniform distribution of the oil between the piston and the cylinder wall.

According to the invention, a supply of oil is ensured to the sliding surfaces between the piston and the cylinder wall at each stroke of the piston. The oil flow is throttled to a great extent between the plunger 46 and the sleeve 44 so that only so much oil is conveyed out into the cylinder space as is necessary to ensure satisfactory lubrication thereof. On the other hand, there will be no appreciable collection of oil in the crank case through any excess of oil. In spite of the far extending throttling the arrangement according to the invention is very safe in operation. Contributing toward this is the fact that the plunger 46 will move up and down during the reciprocating movements of the piston and under the influence of the forces of inertia, so that the annular clearance between the same and the sleeve 44 cannot be clogged up by any impurities.

The sleeve 44 is preferably made of a metal having a low coefficient of heat expansion, preferably invar. On the other hand, the plunger 46 is made of steel having a normal coefficient of heat expansion. This results in the throttling clearance between the two elements being greater when they are cold than after they have been heated. As is well known, the viscosity of the oil is increased with a rising temperature, and through this selection of materials, an automatic control of the width of the clearance will be obtained in accordance with the viscosity of the oil, so that the quantity of oil supplied will be constant as far as possible.

The external casing 40 is preferably made of steel, while the element 42 is made of a bronze alloy the coefficient of heat expansion of which is greater than that of the steel. By suitably dimensioning the length of the element 42 a compensation may be effected in this manner so that the total change in length of the sleeve and the element 42 between their points of clamping in the casing 40 will equal the alteration in length of the latter. Consequently the sleeve 44 is always tightly clamped, independently of the temperature, against the element 42 and the nut 48, so that leakage of oil along the external side of the sleeve is safely prevented.

The interior of the piston is sealed from the atmosphere by a packing consisting of a number of resilient laminae 64, which are attached with their inner peripheral portions in the head 18 of the connecting rod, while their outer peripheral portions carry an annular metallic sliding shoe 66. This sliding shoe may then be rigidly connected with the laminae by a flange-like portion of the shoe being turned down over the outer periphery thereof. The sliding shoe 66 bears on the spherical sliding surface of the piston element 22 with a certain initial pressure produced by the resilient laminations.

The throttling means may supply oil to the cylinder wall discontinuously, in such manner, for example, that a valve-like device is operated through the movements of the piston so as to open and close a connection through the oil passages in the piston. A plurality of plungers 46 may be provided in one piston.

While a more or less specific embodiment of the invention has been shown, it is to be understood that the same is for purpose of illustration only, and that the invention is not to be limited thereby, but its scope is to be determined by the appended claims viewed in the light of the prior art.

What we claim is:

1. A piston having a passage formed therein and leading to the outer cylindrical surface of the piston, means for supplying lubricant under pressure to said passage, and means for throttling flow of lubricant through said passage including relatively movable members having a continuously open clearance therebetween.

2. A piston having a passage formed therein, said passage including two sections, one of which leads to the outer cylindrical surface of the piston, means for supplying lubricant under pressure to the other section, and throttling means interposed between said sections for restricting flow of lubricant therethrough, said throttling means including a member having a bore therein and a plunger reciprocably mounted in said bore with permanently open clearance space of constant cross-section area between said plunger and said member, the sections of said passage communicating with said clearance space at spaced points.

3. A piston having a passage formed therein, said passage including two sections, one of which leads to the outer cylindrical surface of the piston, means for supplying lubricant under pressure to the other section, and throttling means interposed between said sections for restricting flow of lubricant therethrough, said throttling means including a member having a bore therein and a plunger reciprocably mounted in said bore with permanently open clearance space between said plunger and said member, one of said sections communicating with either end of said bore and the other section being connected to an intermediate point of said clearance space.

4. A piston having a passage formed therein, said passage including two sections, one of which leads to the outer cylindrical surface of the piston, means for supplying lubricant under pressure to the other section, and throttling means interposed between said sections for restricting flow of lubricant therethrough, said throttling means including a member having a bore therein and a plunger reciprocably mounted in said bore with permanently open clearance space between said plunger and said member, the section which is supplied with lubricant under pressure communicating with either end of said bore and the other section being connected to an intermediate point of said clearance space.

5. A piston having a passage formed therein, said passage including two sections, one of which leads to the outer cylindrical surface of the piston, means for supplying lubricant under pressure to the other section, and throttling means interposed between said sections for restricting flow of lubricant therethrough, said throttling means including a member having a cylindrical bore therein and a cylindrical plunger reciprocably mounted in said bore with permanently open clearance between said plunger and said member, one of said sections communicating with both ends of said bore and the other section being connected to said clearance space at a plurality of points equally spaced peripherally around said bore and intermediate of the ends of said space.

6. A piston having a passage formed therein, said passage including two sections, one of which leads to the outer cylindrical surface of the piston, means for supplying lubricant under pressure to the other section, and throttling means interposed between said sections for restricting flow of lubricant therethrough, said throttling means including a member having a cylindrical bore therein extending substantially parallel to the axis of said piston and a plunger reciprocably mounted in said bore with permanently open clearance space between said plunger and said member, the sections of said passage communicating with said clearance space at spaced points.

7. A piston having a passage formed therein, said passage including two sections, one of which leads to the outer cylindrical surface of the piston, means for supplying lubricant under pressure to the other section, and throttling means interposed between said sections for restricting flow of lubricant therethrough, said throttling means including a member having a bore therein and a plunger reciprocably mounted in said bore with permanently open clearance space between said plunger and said member, said plunger having an axial passage therethrough to equalize pressure at opposite ends thereof, one of said sections being connected to one end of said bore and the other section being connected to an intermediate point of said clearance space.

8. A piston having a passage formed therein, said passage including two sections, one of which leads to the outer cylindrical surface of the piston, means for supplying lubricant under pressure to the other section, and throttling means interposed between said sections for restricting flow of lubricant therethrough, said throttling means including a member having a bore therein and a plunger reciprocably mounted in said bore with permanently open clearance space between said plunger and said member, said member being made of material having a lower coefficient of expansion than that of said plunger, the sections of said passage communicating with said clearance space at spaced points.

9. A piston having a passage formed therein, said passage including two sections, one of which leads to the outer cylindrical surface of the piston, means for supplying lubricant under pressure to the other section, and throttling means interposed between said sections for restricting flow of lubricant therethrough, said throttling means including a casing, a sleeve member having a bore and a rod member clamped within said casing, and a plunger reciprocably mounted in said bore with permanently open clearance space between said plunger and said sleeve member, the coefficient of expansion of said sleeve member being lower than that of said plunger and said casing, and the coefficient of expansion of said rod member being higher than that of said sleeve member, the sections of said passage communicating with said clearance space at spaced points.

10. A piston having a passage formed therein, said passage including two sections, one of which leads to the outer cylindrical surface of the piston, means for supplying lubricant under pressure to the other section, and throttling means interposed between said sections for restricting flow of lubricant therethrough, said throttling means including a member having a bore therein and a plunger reciprocably mounted in said bore with permanently open clearance space between said plunger and said member, said throttling means being disposed in part at least outside of the body of the piston, the sections of said passage being in communication with said clearance space at spaced points.

11. A piston having a passage formed therein, a connecting rod movably connected to said piston and formed with a lubricant channel, said passage including two sections, one of which leads to the outer cylindrical surface of the piston, the other section being in communication with said channel, a resilient lubricant seal between said piston and connecting rod, and throttling means interposed between said sections for restricting flow of lubricant therethrough, said throttling means including a member having a bore therein and a plunger reciprocably mounted in said bore with permanently open clearance space between said plunger and said member the sections of said passage being in communication with said clearance space at spaced points.

12. A piston having a passage formed therein, said passage including two sections, one of which leads to the outer cylindrical surface of the piston, means for supplying lubricant under pressure to the other section, means to reciprocate said piston, and throttling means interposed between said sections for restricting flow of lubricant therethrough, said throttling means including a member having a bore therein extending substantially parallel to the direction of reciprocal movement of said piston and a plunger reciprocably mounted in said bore with permanently open clearance space between said plunger and said member, said plunger having sufficient inertia to be reciprocated within said bore as a result of the reciprocation of said piston, the sections of said passage communicating with said clearance space at spaced points.

AUGUST GUNNAR
FERDINAND WALLGREN.
KALEB EMIL EVRELL.